UNITED STATES PATENT OFFICE.

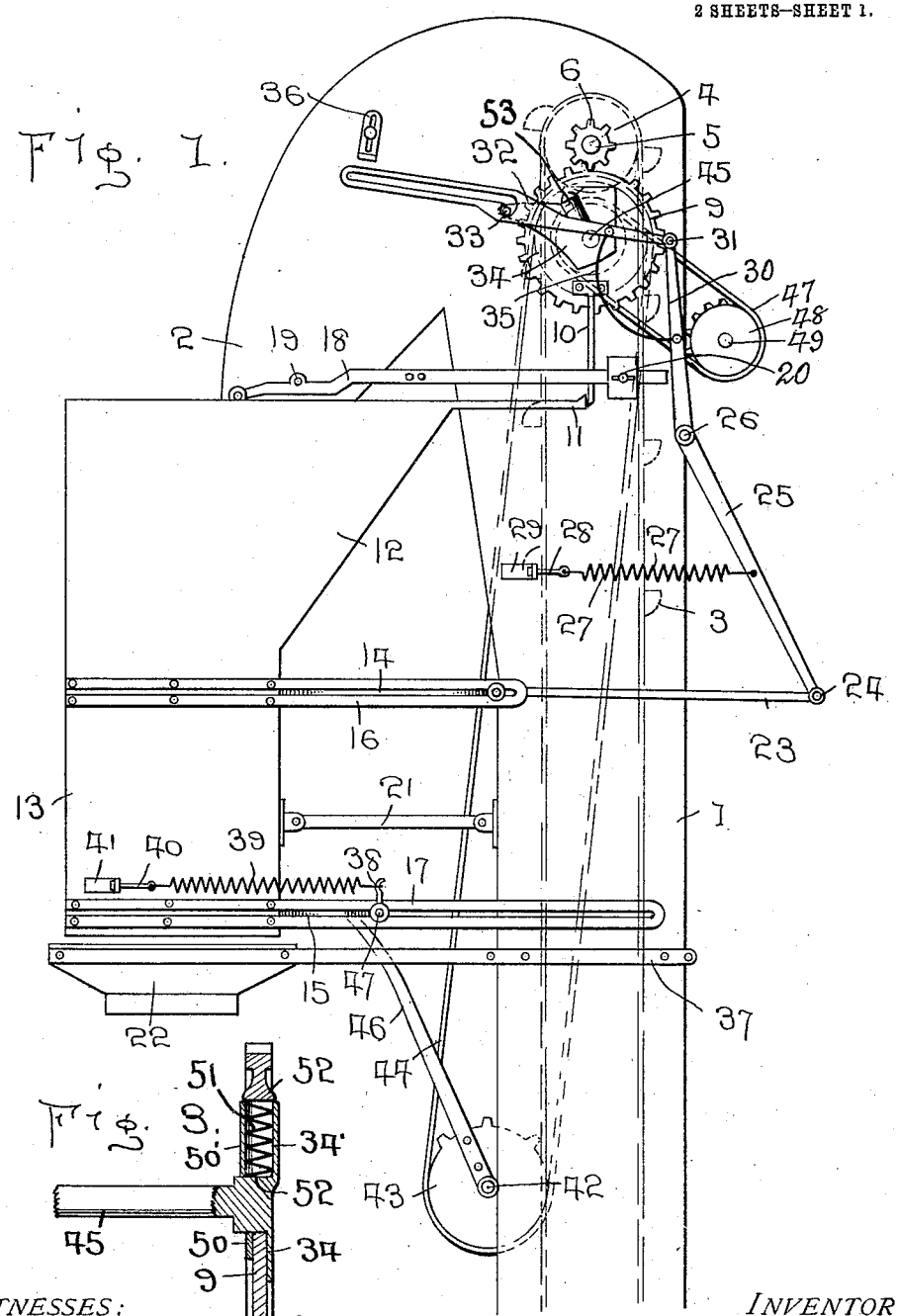

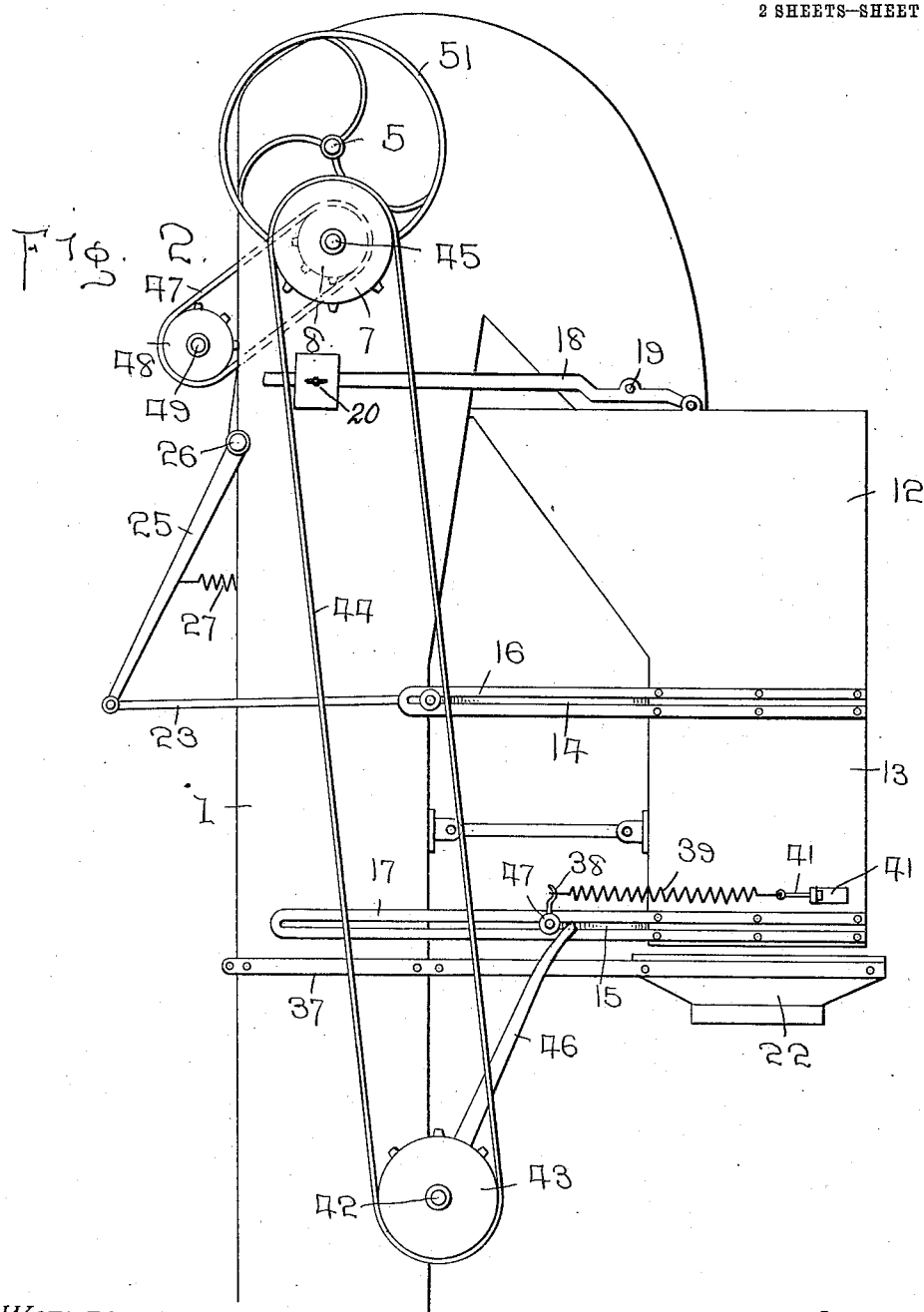

OLAF J. ODDEN, OF GOLDEN LAKE TOWNSHIP, STEELE COUNTY, NORTH DAKOTA.

GRAIN-ELEVATOR MEASURING ATTACHMENT.

1,056,823.  Specification of Letters Patent.  Patented Mar. 25, 1913.

Application filed December 1, 1911. Serial No. 663,267.

*To all whom it may concern:*

Be it known that I, OLAF J. ODDEN, citizen of the United States, residing in Golden Lake township, in the county of Steele and State of North Dakota, have invented certain new and useful Improvements in Grain-Elevator Measuring Attachments; and I do hereby declare the following to be a full, clear, and exact description of the invention, such as will enable others skilled in the art to which it appertains to make and use the same.

This invention relates to measuring attachments for grain elevators and more particularly to means for automatically measuring the grain by volume as it leaves the elevator.

An object of the invention is to provide means positioned at the mouth of the grain elevator whereby the grain as it leaves the elevator may be measured by volume and will automatically start the measuring mechanism into operation when the proper quantity of grain has fallen into the measuring hopper and from there into the measure proper.

Another object is to provide mechanism of this character which may be applied to the ordinary threshing machine, which will effectively perform its duties regardless of the character of the grain.

Another object is to provide measuring means of this nature which will be automatic and positive in its operation, being started into operation by the volume of grain and caused to continue its operation by the operation of the elevator.

Other objects and advantages will be hereinafter set forth and pointed out in the specification and claim.

In the accompanying drawings which are made a part of this application, Figure 1 represents a side elevational view of the mechanism, showing the parts thereof secured to one side of the elevator, and, Fig. 2 is a similar view to Fig. 1, looking at the opposite side of the elevator and clearly illustrating the parts of the measuring mechanism located on this side. Fig. 3, is a vertical section through the mutilated gear wheel and the end of the shaft upon which it is mounted.

Referring to the drawings in which similar reference numerals designate corresponding parts throughout the several views, 1 represents the grain elevator casing and 2 the mouth thereof. Within the casing 1 travels the ordinary elevator 3, working over the upper sprocket wheel 4, positioned at the upper end of the vertical portion of the elevator, as is usual. The shaft 5, upon which the wheel 4 is mounted, projects through the sides of the elevator casing 1 and carries upon one end the small gear wheel 6 and upon its opposite end the fly wheel 5'.

Mounted upon one end of the shaft 45 secured to the casing 1 and parallel with the shaft 5 but below the latter, is the mutilated gear wheel 9, the teeth of which are adapted for engagement with the teeth of the gear wheel 5 when the measuring mechanism is in operation, said gear wheel 9 being caused to rotate by means of said gear wheel 4. Mounted upon the opposite ends of the shaft 45, outwardly of the casing 1, are the sprocket wheels 7 and 8, the purpose of which will later appear. Secured to the gear wheel 9 and opposite to the non-toothed portion thereof is the stop arm 10, which is normally pointing downwardly and engages against the stop projection 11, carried by the hopper 12. The hopper 12 is positioned directly beneath the mouth of the elevator and receives the grain as it drops from the mouth 2. The lower part of the elevator mouth is on the same level as the top of the hopper when at its highest or normal position and serves to limit the upward movement of the hopper. It is obvious that by this construction, the hopper is prevented from overflowing, since the grain cannot rise to a greater height in the hopper than the lower part of the elevator mouth, except within said mouth. This is of great advantage when the quantity of grain delivered by the elevator is excessive. By this construction and relation, frictional contact between the elevator mouth and hopper is avoided. Neither can grain or other matter jam or clog between said mouth and hopper, as is often the case with similar mechanisms, in which the elevator mouth enters the hopper.

Integral with the hopper 12 is the measuring vessel 13, having the lower sliding closure 15 working in slotted guide bars 17 which are secured to the measuring vessel. A similar pair of slide bars 16 guide the upper sliding closure 14 which separates the interior of the measuring vessel from that of the hopper, the latter being superposed on the measuring vessel. The hopper is of greater capacity than the measuring vessel, because of which relation, the measuring vessel may usually be filled instantly from the hopper, thus avoiding loss of time in the measuring operation, and also avoiding "choking" in the mouth of the elevator. Pivoted to the hopper 12 at 18a, are the weight-carrying bars or levers 18, which are also pivoted to the elevator mouth, as shown at 19, and carry adjustably mounted thereon, the weights 20, said weights and levers supporting the hopper and measuring vessel. Pivoted to the measuring vessel 13 and also to the elevator casing 1, is the connecting link or bar 21, which serves to guide the measure 13 and hopper 12 as they move in a vertical plane. The lower end of the measure 13 is positioned above the funnel 22 to discharge the grain therein when the lower slide 15 opens after the slide 14 has automatically closed. Pivoted to the sliding closure 14 are the connecting arms or bars 23 carried by the shaft 24 to which is pivotally secured the lower end of the rock arm 25, rocking on the rock shaft 26. To the rock arm 25 is connected one end of the coiled spring 27, which has its opposite end carried in the eye 28 secured to the ear 29, which latter is carried upon the side of the elevator casing 1. The spring 27 assists in closing the slide 14, as will be later more fully described.

Secured to the rock shaft 26 and extending upwardly therefrom, is the arm 30 pivoted to the stub shaft 31, upon which is pivoted one end of the slotted finger 32, which finger has the inner end of its slot offset and rounded to receive at times the locking pin 33, which is adapted to travel in the slot of the finger 32. The pin 33 is carried by the plate 34 secured to the end of the shaft 45, outwardly of the mutilated gear wheel 9. Connecting the arms 30 and the finger 32 and normally pressing the latter upwardly to retain the offset portion of the slot engaged around the pin 33, is the leaf spring 35 having one end secured to the arm 30 and the other end secured to the finger 32.
Secured to the side of the elevator casing at its curved portion near the mouth thereof, is the adjustable movement limiting stop 36, which limits the upward movement of the outer end of the finger 32, as will be later more clearly understood.

The funnel 22 is preferably supported in position by the bracket arms 37 secured thereto and to the elevator casing 1. Secured to the slide 15, or rather a hook 38 extending upwardly therefrom, is one end of the coiled spring 39, which has its opposite end secured in an eye 40 carried by the angle iron 41 secured to the measure 13. The purpose of this spring is to normally retain the slide 15 in its inner position, thus closing the lower end of the measure 13. Mounted upon the shaft 42 carried by the elevator casing 1, is the sprocket wheel 43, over which works the sprocket chain 44. The sprocket chain 44 also passes over the sprocket wheel 7 carried on the shaft 45, and from this sprocket transmits power to the sprocket wheel 43 to cause the latter to rotate. Carried upon the shaft 42 are the arms 46, which engage against the rollers 47, carried by the lower slide 15, to draw the latter toward the elevator casing 1, against the tension of the spring 39, said arms sliding out of engagement with the rollers 47 as the shaft rotates, allowing the slides to be again closed by the spring 39.

Passing over and around the sprocket wheel 8 is the sprocket chain 47, which also passes around the sprocket wheel 48 carried on the shaft 49 supported outwardly of the casing 1. By these sprocket wheels 8 and 48 and the sprocket chain 47 passing thereover, suitable registering mechanism may be operated to register the number of bushels or other predetermined quantities of grain measured by the measure 13.

The plate 34 is rigid upon the outer end of the shaft 45, outwardly of the mutilated wheel 9 and has a bulged portion 34′. A second plate 50 is loosely mounted on the end of the shaft 45, and engaged against the inner or opposite face of the wheel 9 from the plate 34 and locked with the wheel, as will be presently described. The plate 50 has a bulged portion 50′ and is positioned in such manner that said bulged portion is opposite the bulged portion 34′ of the plate 34. A portion of the mutilated wheel 9 is cut out, from the central opening to accommodate the end of the shaft 45, to within a short distance of the outer edge of the wheel and within this opening is located the coil spring 51, the spring being positioned with one end pressing against the seat 52 of the wheel 9, while its opposite end rests upon the squared portion 53 of the end of the shaft. It will be apparent that as the plates 35 and 50 are upon opposite sides of the wheel and provided with their bulged portions 34′ and 51′ respectively, to accommodate the spring 51, the latter and the opening through the wheel will be protected. The plate 34 is secured in position and connected with the grate 34, and any proper securing means (not shown) may be employed for this purpose.

The spring 51 is positioned between the end of the shaft 45 and the teeth of the mutilated wheel 9 which are the first to be engaged by the wheel 6 to start rotation of the mutilated gear wheel 9. It will be seen that the wheel 9 is resiliently mounted, and should the teeth of the wheels 6 and 9 fail to register properly, the teeth upon the former will exert a downward pressure upon the teeth of the latter, against the tension of the spring 51. This spring will thereby be compressed, allowing the wheel 9 to move downwardly sufficient to permit of the teeth on the wheel 6 engaging properly between the teeth of the wheel 9, thus eliminating all danger of breaking the teeth on either of the wheels 6 and 9. Thus it will be seen that accurate engagement of the teeth on the wheels 6 and 9 is assured and all danger of stripping the same is eliminated.

The operation of the measuring mechanism is as follows: The slide 15 is normally closed and the slide 14 open, as illustrated, and the parts are in the positions shown. The grain elevator is in motion, carrying grain upwardly through the casing 1 and feeding the grain to the mouth 2 of said elevator. From the mouth 2 the grain drops into the hopper 12 and into the measure 13, filling the same and at least partly filling the hopper 12. When the measure 13 has been filled to overflowing so that the combined weight of the grain and the mechanism supported by the hopper 18 overbalances the weight 20, said measure and hopper will drop downwardly, swinging upon the link 21. As the measure 13 and the hopper 12 descend, the stop 11 will be drawn downwardly away from engagement with the stop arm 10. The spring 35 will then force the finger 32 upwardly until it is stopped by the adjustable movement limiting stop 36. When this upward movement of the finger 32 has been stopped, the wheel 9 will have been rotated thereby sufficiently to engage its teeth with those of the gear wheel 4. As this wheel 6 is continually kept in motion by the elevator, it forces the wheel 9 to rotate until the teeth of the wheel 6 are disengaged from those of the wheel 9, because of the mutilated portion of the latter, and the stop 11 intercepts the arm 10. The shaft 45 and the sprocket wheel 9 thus rotating causes, through the medium of the sprocket chain 44, the sprocket wheel 43 to rotate, carrying the shaft 42 therewith. The shaft 42 carries the arms 46 therewith and draws the slide 15 outwardly, allowing the grain to drop from the measure 13 into and through the funnel 22. It will be understood that in the meantime the spring 27 will have rocked the arms 25 and 30 on the rock shaft 26 and drawn the finger 32 away from under the finger stop 36 until the pin 33 is engaged in the outer end of the slot of the finger, and at the same time will have forced inwardly to its closed position the slide 14, cutting off the grain between the hopper 12 and the vessel 13. This operation will take place before the slide 15 opens. Thus it will be seen that only a predetermined quantity of grain, or in other words one vessel measure full of grain, will be allowed to pass into the funnel 22 at each cycle of the mechanism, as described. As the wheel 9 continues to rotate and thus rotates the arms 46, the latter slide away from the rollers 47, as before explained, after the slide has been opened to its fullest extent and the grain has dropped from the measure 13. The spring 39 then automatically closes the slide 15, and as the wheel 9 completes its revolution, the pin 33 moves along the slot of the finger 32 and engages the offset portion thereof and carries the finger back to its normal position, as shown on the drawings. Before the wheel 9 completes its revolution, however, the measure 13 and hopper 12 will have been again raised to their normal position, by means of the lever 18 and weight 20, the said hopper and measure being lighter after the discharge of grain from the measure 13, and as the stop arm 10 assumes its normal downward position the end thereof engages against the stop 11. At this moment the non-toothed portion of the mutilated gear wheel 9 is opposite the gear wheel 6 and there is, therefore, no engagement of the teeth of the gear wheel 9 with those of the gear wheel 6, and consequently no stripping of teeth. The finger 32, returning to its normal position, causes the ends of the rock arms 30 and 35 to move in opposite directions and again draw the slide 14 outward against the tension of the spring 27, allowing the grain within the hopper 12 to fall into the measure 13 and also allowing more grain from the elevator mouth to pass from the hopper 12 and into the measure 13.

It will be apparent that each time the measure 13 is filled to overflowing the above described operation will be repeated and, by means of the sprocket wheels 8 and 48 and the sprocket chain 47 connecting the same, any proper form of registering mechanism (not shown) may be operated to register the number of bushels, or other predetermined units of measure, of grain passing from the elevator mouth.

It will be seen that this mechanism will automatically and positively measure the grain accurately as it passes from the elevator of a threshing or other grain feeding machine, measuring the grain by volume instead of weight. This is a great advantage, as it is a well known fact that the various grains are of different weights, requiring a different measuring mechanism for each kind of grain when measuring by weight. It will also be evident to those familiar with the art that this mechanism may be applied to and used in connection with any elevator upon a threshing or other grain treating machine, and will be automatic and accurate in operation. It will also be seen that this mechanism will operate as long as the elevator supplies grain thereto, whether constantly or intermittently, whether in large or small quantities, and does not need the constant attention of the operator or an attendant, the grain being automatically fed through the funnel 22 to bags or other receptacles, as may be desired.

What I claim is:

In combination, a spout, means for delivering material to the spout, a gear wheel carried by the material delivering means, a measuring mechanism connected with said spout and comprising a measuring vessel under the spout, a resiliently mounted and radially movable gear wheel adapted to be alternately in and out of mesh with the first said gear wheel, and means associated with said resiliently and radially movable gear wheel for alternately opening and closing said measuring vessel.

In testimony whereof I have signed my name to this specification in the presence of two subscribing witnesses.

OLAF J. ODDEN.

Witnesses:
F. W. AMES,
O. A. OLSON.